United States Patent
Usbergo et al.

(10) Patent No.: US 9,325,942 B2
(45) Date of Patent: Apr. 26, 2016

(54) DISPLAYING VIDEO CALL DATA

(71) Applicant: Microsoft Technology Licensing, LLC, Redmond, WA (US)

(72) Inventors: Alex Usbergo, Stockholm (SE); Daniele Pizziconi, Stockholm (SE); Andrew Clifford Wassyng, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/459,247

(22) Filed: Aug. 13, 2014

(65) Prior Publication Data
US 2015/0296179 A1 Oct. 15, 2015

(51) Int. Cl.
H04N 7/14 (2006.01)
H04N 7/15 (2006.01)
G06F 3/0481 (2013.01)
G06F 3/0482 (2013.01)
G06F 3/0484 (2013.01)
H04N 21/431 (2011.01)

(52) U.S. Cl.
CPC .............. *H04N 7/15* (2013.01); *G06F 3/0482* (2013.01); *G06F 3/04812* (2013.01); *G06F 3/04842* (2013.01); *H04N 7/141* (2013.01); *H04N 21/4316* (2013.01)

(58) Field of Classification Search
CPC ........... H04N 7/15; H04N 7/14; H04N 7/141; H04N 7/147; H04N 7/152; H04N 7/155; H04N 7/157
USPC ............................................ 348/14.01–14.16
See application file for complete search history.

(56) References Cited

U.S. PATENT DOCUMENTS 8,352,983 B1  1/2013  Chane et al.
8,379,077 B2  2/2013  Wu et al.
(Continued)

FOREIGN PATENT DOCUMENTS

EP  1441522  7/2004
EP  1881683  1/2008
EP  2026578  2/2009

OTHER PUBLICATIONS

"Understanding How Participants Display in Layout Views", Retrieved From: <http://mcu.uk.codian.com/help_views.html> Apr. 14, 2014, 2010, 4 Pages.
(Continued)

*Primary Examiner* — Stella L Woo
(74) *Attorney, Agent, or Firm* — Danielle Johnston-Holmes; Micky Minhas

(57) ABSTRACT

A device comprising: a display; an interface configured to exchange video data between the device and a network during a video call between a user of the device and at least one further user; a memory storing information identifying at least one display element each associated with one of the at least one further user; and a processor configured to run a client application operable during the call to: display received video in a first UI window on the display; detect the user navigating to a second UI window comprising one of the at least one display element; query the memory to determine a location for the display of the received video, and in response, display the second UI window and control the video received from the further user associated with the display element of the second user interface window to be displayed at a location of the display element.

20 Claims, 7 Drawing Sheets

(56) References Cited

U.S. PATENT DOCUMENTS

| | | | |
|---|---|---|---|
| 9,083,848 | B2* | 7/2015 | Ok |
| 2002/0145610 | A1 | 10/2002 | Barilovits et al. |
| 2007/0285505 | A1 | 12/2007 | Korneliussen |
| 2008/0062249 | A1 | 3/2008 | Nagase et al. |
| 2008/0088698 | A1* | 4/2008 | Patel et al. ............. 348/14.09 |
| 2010/0333004 | A1 | 12/2010 | Kristiansen et al. |
| 2012/0098919 | A1 | 4/2012 | Tang et al. |
| 2013/0027502 | A1 | 1/2013 | Skramstad |
| 2013/0106988 | A1 | 5/2013 | Davis et al. |
| 2014/0036027 | A1 | 2/2014 | Liu |
| 2014/0354762 | A1* | 12/2014 | Bae et al. ............. 348/14.07 |

OTHER PUBLICATIONS

Firestone, et al., "Voice and Video Conferencing Fundamentals", In Proceedings: Cisco Press, Mar. 26, 2007, 397 Pages.

Greene, "Video Conference on Kinect?", Retrieved From: <http://www.quepublishing.com/articles/article.aspx?p=1741119&seqNum=2> May 20, 2014, Aug. 3, 2011, 4 Pages.

Roettgers, "Google Adds Hangouts Live Streaming & Hangouts Mobile", Retrieved From: <http://gigaom.com/2011/09/20/google-rolls-out-hangouts-live-streaming-hangouts-mobile/> May 20, 2014, Sep. 20, 2011, 4 Pages.

"International Search Report and Written Opinion", Application No. PCT/US2015/024418, Jul. 14, 2015, 13 pages.

* cited by examiner

US 9,325,942 B2

DISPLAYING VIDEO CALL DATA

RELATED APPLICATIONS

This application claims priority under 35 USC §119 or §365 to Great Britain Patent Application No. 1406789.6 entitled "DISPLAYING VIDEO CALL DATA" filed Apr. 15, 2014, the disclosure of which is incorporate in its entirety.

BACKGROUND

Packet-based communication systems allow the user of a device, such as a personal computer, to communicate across the computer network using a packet protocol such as Internet Protocol (IP). Packet-based communication systems can be used for various types of communication events. Communication events which can be established include voice calls, video calls, instant messaging, voice mail, file transfer and others. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

Communications systems allow users of devices to communicate across a computer network such as the internet. Communication events which can be established include voice calls, video calls, instant messaging, voice mail, file transfer and others. With video calling, the callers are able to view video images of the other party in addition to voice information. This enables a much more natural communication between the parties, as facial expressions are also communicated, thereby making video calls more comparable to a face-to-face conversation.

SUMMARY

During a video call, client software executed on a device displays received video data in a user interface window (e.g. a main video presentation screen) on a display of the device.

The inventors have recognised problems with known video calls. In particular in that when a user of the device navigates away from a main video presentation screen, known solutions render received video in a floating window that overlays the main view on the screen, in this case the position of the window may obscure the user's view of a UI element that he wants to view on the screen. This is particularly problematic on mobile devices where the available screen size is typically limited. Known solutions are also restrictive in that during a multiparty video call, the floating window will only display video data received from the active speaker.

According to one aspect of the present disclosure there is provided a user device comprising: a display; a network interface configured to transmit and receive video data between the user device and a communication network during a video call between a user of said user device and at least one further user; a memory storing information identifying at least one display element each associated with one of said at least one further user; and one or more processors configured to run a communication client application operable during said video call to: display received video data in a first user interface window on said display; detect an input selection by the user of said user device to navigate to a second user interface window comprising one of said at least one display element; query said memory to determine a location for the display of the received video data, and in response to said query display the second user interface window on the display and control the video data received from the further user associated with said display element of the second user interface window to be displayed at a location of said display element.

According to a further aspect of the present disclosure there is provided a method implemented at a user device, the method comprising: receiving video data from at least one further user over a communications network during a video call with said at least one further user via a network interface of said user device; displaying received video data in a first user interface window on a display of said user device; detecting an input selection by the user of said user device to navigate to a second user interface window comprising a display element associated with one of said at least one further user; and querying a memory storing information identifying at least one display element each associated with one of said at least one further user, and in response to said query display the second user interface window on the display and control the video data received from the further user associated with said display element of the second user interface window to be displayed at a location of said display element. The display element may be a graphical image.

According to another aspect of the present disclosure there is provided a computer program product, the computer program product being embodied on a non-transient computer-readable medium and configured so as when executed on a processor of a user device during a video call between a user of said user device and at least one further user, to perform any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Figure 1:
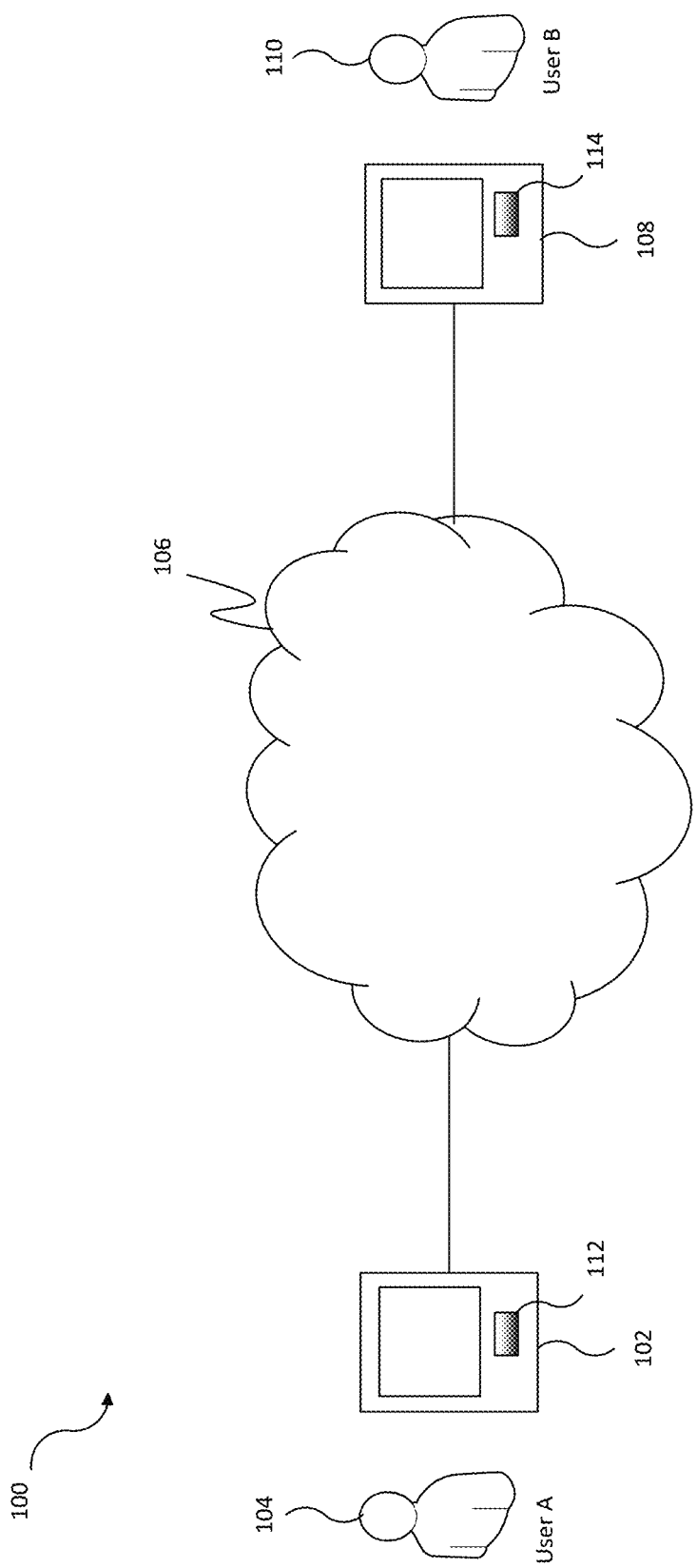
FIG. 1 shows a communication system.

FIG. 1 shows a communication system 100 comprising a first user 104 (User A) who is associated with a user terminal 102 and a second user 110 (User B) who is associated with a user terminal 108. The user terminals 102 and 108 can communicate over a communication network 106 in the communication system 100, thereby allowing the users 104 and 110 to communicate with each other over the communication network 106. The communication network 106 may be any suitable network which has the ability to provide a communication channel between the user terminal 102 and the second user terminal 108. For example, the communication network 106 may be the Internet or another type of network such as a High data rate mobile network, such as a 3$^{rd}$ generation ("3G") mobile network.

Note that in alternative embodiments, user terminals can connect to the communication network 106 via an additional intermediate network not shown in FIG. 1. For example, if the user terminal 102 is a mobile device, then it can connect to the communication network 106 via a cellular mobile network (not shown in FIG. 1), for example a GSM or UMTS network.

The user terminal 102 may be, for example, a mobile phone, a personal digital assistant ("PDA"), a personal computer ("PC") (including, for example, Windows™, Mac OS™ and Linux™ PCs), a tablet computer, a gaming device or other embedded device able to connect to the communication network 106. The user terminal 102 is arranged to receive information from and output information to User A 104.

The user terminal 102 executes a communication client application 112, provided by a software provider associated with the communication system 100. The communication client application 112 is a software program executed on a local processor in the user terminal 102. The communication client application 112 performs the processing required at the user terminal 102 in order for the user terminal 102 to transmit and receive data over the communication system 100. The communication client application 112 executed at the user terminal 102 may be authenticated to communicate over the communication system through the presentation of digital certificates (e.g. to prove that user 104 is a genuine subscriber of the communication system—described in more detail in WO 2005/009019).

The user terminal 108 may correspond to the user terminal 102. The user terminal 108 executes, on a local processor, a communication client application 114 which corresponds to the communication client application 112 executed at the user terminal 102. The communication client application 114 at the user terminal 108 performs the processing required to allow User 110 to communicate over the network 106 in the same way that the communication client application 112 at the user terminal 102 performs the processing required to allow the User A 104 to communicate over the network 106. The user terminals 102 and 108 are end points in the communication system. FIG. 1 shows only two users (104 and 110) and two user terminals (102 and 108) for clarity, but many more users and user devices may be included in the communication system 100, and may communicate over the communication system 100 using respective communication clients executed on the respective user devices, as is known in the art.

Figure 2:
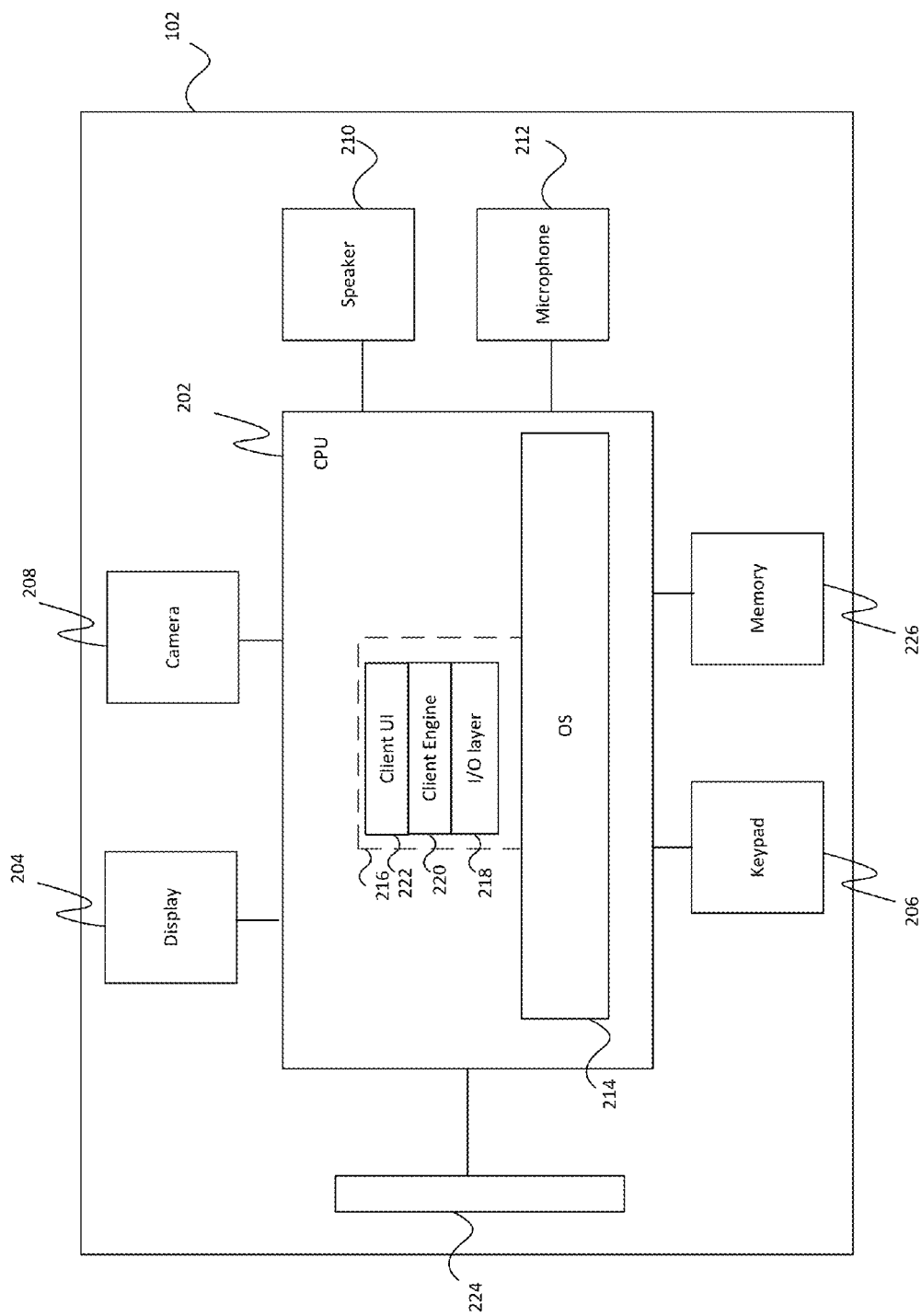
FIG. 2 shows a schematic view of a user terminal.

FIG. 2 illustrates a detailed view of the user terminal 102 on which is executed a communication client application for communicating over the communication system 100. The user terminal 102 comprises a central processing unit ("CPU") 202, to which is connected a display 204 such as a screen or touch screen, input devices such as a keypad 206, a camera 208, and touch screen 204. An output audio device 210 (e.g. a speaker) and an input audio device 212 (e.g. a microphone) are connected to the CPU 202. The display 204, keypad 206, camera 208, output audio device 210 and input audio device 212 may be integrated into the user terminal 102 as shown in FIG. 2. In alternative user terminals one or more of the display 204, the keypad 206, the camera 208, the output audio device 210 and the input audio device 212 may not be integrated into the user terminal 102 and may be connected to the CPU 202 via respective interfaces. One example of such an interface is a USB interface. The CPU 202 is connected to a network interface 224 such as a modem for communication with the communication network 106. The network interface 224 may be integrated into the user terminal 102 as shown in FIG. 2. In alternative user terminals the network interface 224 is not integrated into the user terminal 102. The user terminal 102 also comprises a memory 226 for storing data as is known in the art. The memory 226 may be a permanent memory, such as ROM. The memory 226 may alternatively be a temporary memory, such as RAM.

The user terminal 102 is installed with the communication client application 112, in that the communication client application 112 is stored in the memory 226 and arranged for execution on the CPU 202. FIG. 2 also illustrates an operating system ("OS") 214 executed on the CPU 202. Running on top of the OS 214 is a software stack 216 for the communication client application 112 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine 220 also communicates with the client user interface layer 222. The client engine 220 may be arranged to control the client user interface layer 222 to present information to the user of the user terminal 102 via the user interface of the client which is displayed on the display 204 and to receive information from the user the user terminal 102 via the user interface.

Users of the communication system 100 can select an "avatar" which is a static image chosen by the user to represent themselves to other users of the communication system 100. An avatar chosen by a user may be a photograph of themselves although it need not necessarily be, the avatar may be any static image. If a user chooses not to select their own avatar, a default avatar created by the software provider providing the communication client application may be used to represent the user.

Following launch of the communication client application 112 on the user terminal 102 by User A 104, User A 104 may navigate through various user interface windows provided by the communication client application 112 using an input device of the user terminal 102 (for example by using keypad 206, touching the touch-screen 204, sending a voice command using microphone 212 or using a computer mouse (not shown in FIG. 1)). A user interface window provided by the communication client application 112 may be configured to display one or more avatars associated with User A's contacts whom User A 104 may establish a communication event with.

For example, User A 104 may navigate to a user interface window provided by the communication client application 112 which displays a contact list associated with User A 104. The contacts in the contact list are other, remote users of the communication system 100 having their own respective instances of the client application installed in their respective terminals. The contact list is managed by the client engine 220 and may be stored either locally in memory 226 at the user terminal 102 itself or more preferably on a storage medium of a server (not shown in FIG. 1) of the software provider providing the communication client instances (storing the contact list at a server advantageously allows the contact list to be made available even if User A is logged on to a different terminal and/or instance of the communication client application). In order to become a contact of another, remote user, User A must either (i) send a contact request to the communication client application of the remote user which the remote user then selects to accept, or (ii) receive a contact request from the remote user which the User A selects to accept. The contact list displays names (e.g. real names or usernames) associated with User A's contacts. Usernames are selected by users of the communication system 100 to uniquely identify themselves to other users of the communication system 100.

The contact list displays avatars of User A's contacts. The contact list may also include additional information such as presence information of each contact, e.g. indicating that the user is offline, online, busy, away, etc. The contact list may also include a "mood message" of one or more of User A's contacts giving a short statement composed by the user to summarise his or her current status, etc.

In another example, User A 104 may navigate to a user interface window provided by the communication client application 112 which displays a profile page associated with a remote user (e.g. User B 110). The profile page displays an avatar of the remote user. The profile page may include other profile information of the remote user which could include username, real name, mood message, current geographical location, time, gender, language, age and/or date of birth etc.

In yet another example, User A 104 may navigate to a user interface window provided by the communication client application 112 which displays information on User A's recent activity (activity within a predetermined time period) in the communication system 100. In particular the user interface window displays information on recent interactions with User A's contacts. The recent activity information comprises avatars of those contacts that User A 104 has had recent interaction with and information pertaining to the interaction e.g. last IM message received, contact acceptance, missed call etc.

Using the communication client application 112 executed on user terminal 102, User A 104 can conduct a video call over the communications network with User B 110 at user terminal 108. User A either (i) sends a video call establishment request to the communication client application 114 executed on the second user terminal 108 of User B, which the User B 110 then selects to accept, or (ii) receives a video call establishment request from communication client application 114 executed on the second user terminal 108 of User B, which User A 104 selects to accept.

A method implemented during a video call between User A 104 associated with user terminal 102 and User B 110 associated with user terminal 108 over the communications network 106 will now be described with reference to FIG. 3 which is a flow chart for a process 300 of displaying received video call data.

Reference will also be made to FIGS. 4-7 which illustrate exemplary client user interfaces provided by the client user interface layer 222 of the communication client application 112 in various embodiments as part of the process 300.

At step S302, the communication client application 112 executed on the user terminal 102 displays video data received from the user terminal 108 in a first user interface window (e.g. main video presentation) 401 on the display 204. This video data is captured by the camera 208 of the user terminal 108 and transmitted from user terminal 108 over the network 106 to user terminal 102.

Figure 4:
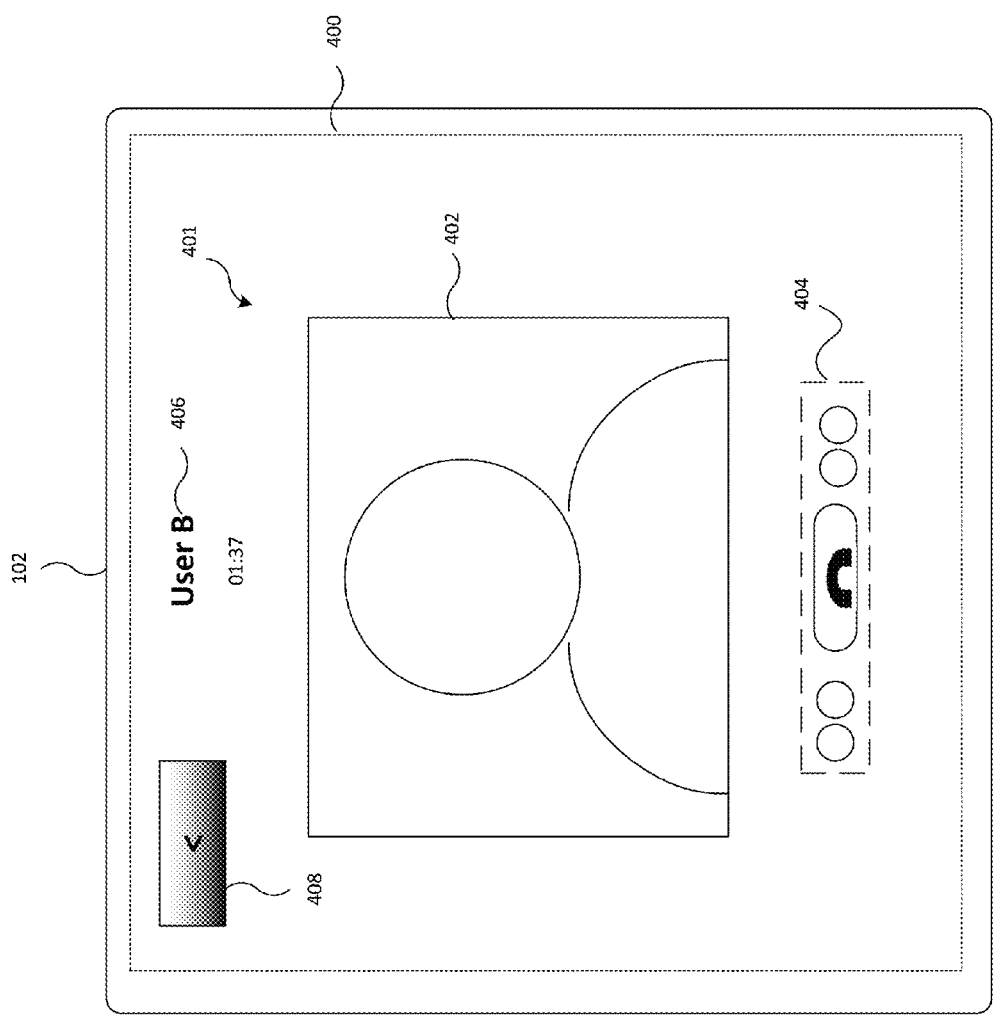
FIG. 4 illustrates a user terminal displaying received video call data in a first user interface window.

As shown in FIG. 4, the first user interface window 401 comprises a display area 402 for the display of video data received over the network 106 from the user terminal 108 associated with User B 110.

The first user interface window 401 may further display selectable buttons 404 available for selection by User A 104 during the video call for control of the video call using an appropriate input device. The selectable buttons 404 may comprise a button to end the video call, to mute audio such that no audio data received during the video is output from the speaker 210, to control the volume of audio output from the speaker 210, and other functionality related to the video call.

The first user interface window 401 displays one or more selectable element which enables User B 110 to navigate to a second user interface window in response to User B 110 selecting the selectable element. That is, in response to detecting selection of the selectable element, the communication client application 112 is configured to display an appropriate second user interface window.

The selectable element referred to above may be a displayed identify (e.g. real name or username) 406 of the other party (e.g. User B 110) in the video call. Additionally or alternatively, the selectable element referred to above may be a selectable button 408.

If at step S304 the communication client application 112 detects an input selection by User A 104 to navigate to a second user interface window the process 300 proceeds to step S306. The communication client application 112 detects input selection by User A 104 to navigate to a second user interface window by detecting selection of the selectable element displayed in the first user interface window.

In absence of User A 104 selecting the selectable element displayed in the first user interface window, the communication client application 112 continues to display the first user interface window 401 on the display 204, this is shown in FIG. 4 by the loop in the process 300 between steps S302 and S304.

At step S306, the communication client application 112 determines a location for the display of the video data received over the network 106 from the user terminal 108 associated with User B 110 that is to be used when a user (e.g. User A 104) navigates away from the first user interface window 401.

The location for the display of the video data received over the network 106 from the user terminal 108 associated with User B 110 that is to be used when a user (e.g. User A 104) navigates away from the first user interface window 401 is predetermined by the provider of the communication client application 112, and the information identifying this display location is stored in memory 226 following installation of the communication client application 112 on the first user terminal. In embodiments of the present disclosure, this display location is a position of an avatar (display element) associated with the remote user(s) (e.g. User B 110) in the video call.

At step S306, the communication client application 112 queries memory 226 and determines that if the second user interface window comprises a location for the display of User B's avatar, then the video data received over the network 106 from the user terminal 108 associated with User B 110 should be displayed in place of User B's avatar that would otherwise be displayed in the second user interface window (if the second user interface window was accessed by User A 104 when not conducting a video call).

At step S308, the communication client application 112 determines if the second user interface window (that User A 104 has selected to navigate to during the video call) comprises a location assigned for the display of User B's avatar. If it is determined at step S308 that the second user interface window comprises a location for the display of User B's avatar the process 300 proceeds to step S310.

At step S310, the communication client application 112 displays the second user interface window (that the first User A 104 has selected to navigate to during the video call) on the display 204, and further controls the video data received over the network 106 from the user terminal 108 associated with User B 110 to be displayed at the location of the second user interface window that would otherwise be used to display User B's avatar (if the second user interface window was accessed by User A when not conducting a video call).

That is, the communication client application 112 displays the second user interface window but rather than displaying a static image representation of User B (User B's avatar) at its assigned location, the communication client application 112 substitutes this static image with the video data received over the network 106 from the user terminal 108 associated with User B 110.

If it is determined at step S308 that the second user interface window does not comprise a location for the display of User B's avatar the process 300 proceeds to step S312. At step S312, the communication client application 112 displays the video data received over the network 106 from the user terminal 108 associated with User B 110 in a window overlaying the second user interface window.

Figure 5:
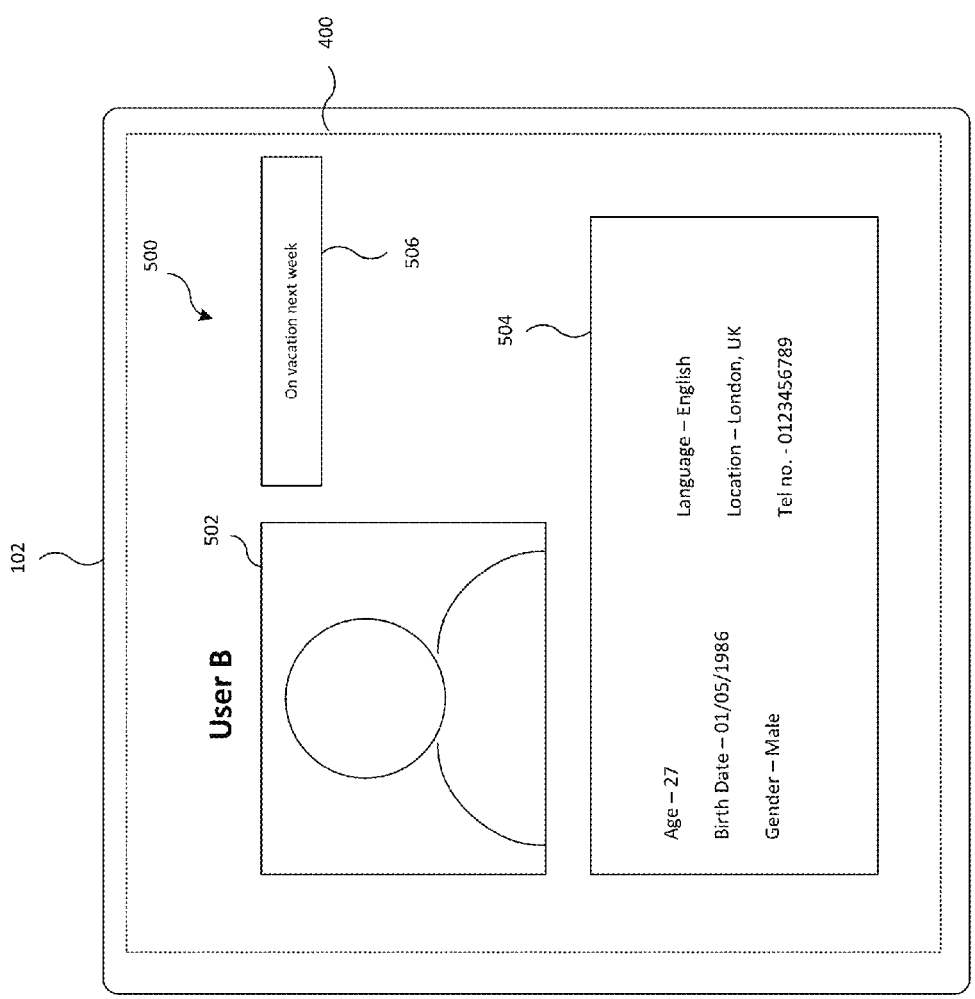
FIG. 5 illustrates a user terminal displaying received video call data in a second user interface window.
Figure 6:
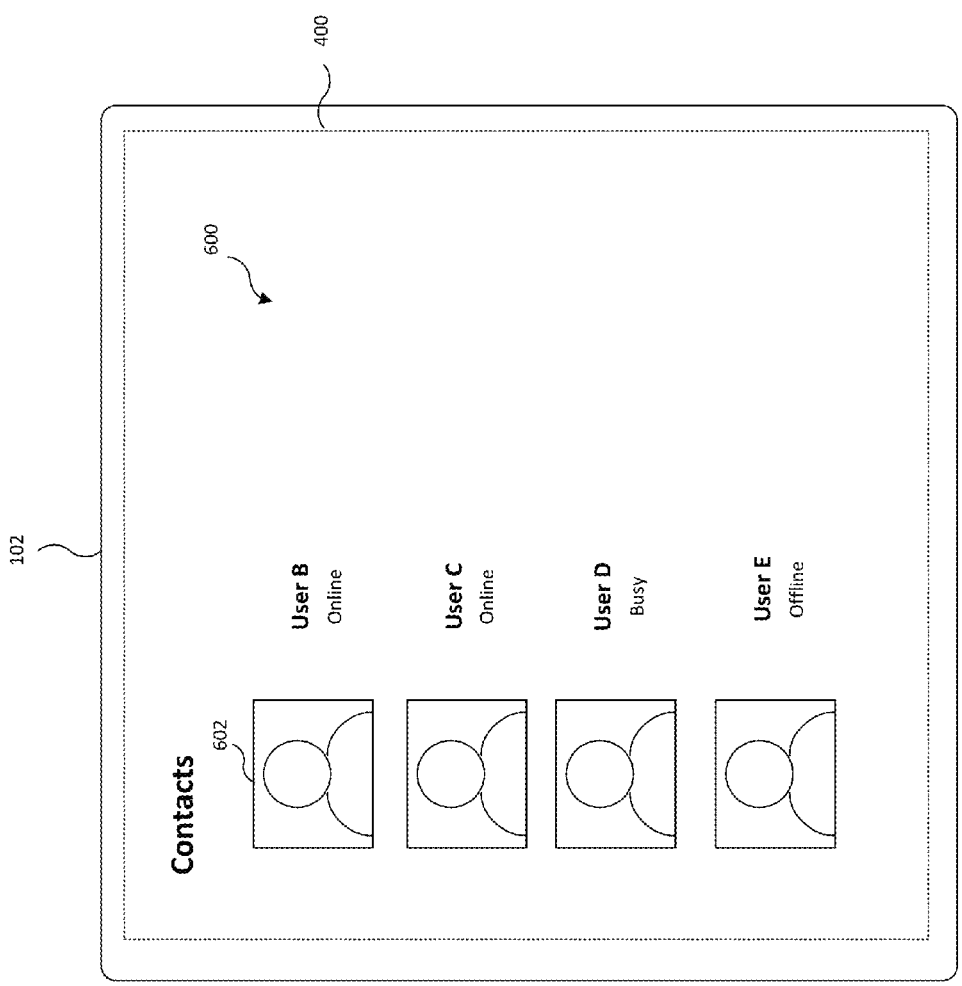
FIG. 6 illustrates a user terminal displaying received video call data in a second user interface window.
Figure 7:
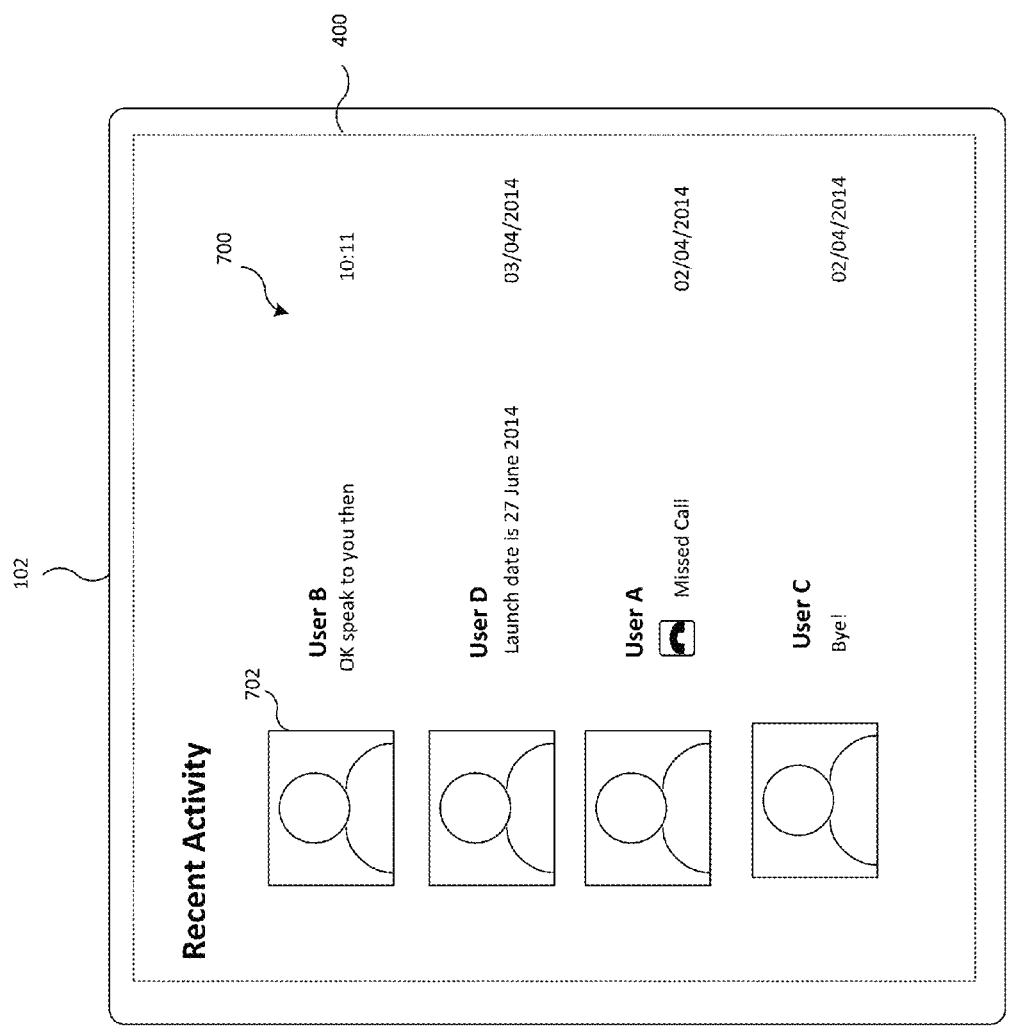
FIG. 7 illustrates a user terminal displaying received video call data in a second user interface window.

To illustrate step S310 of the process 300 further, reference is made to FIGS. 5-7.

FIG. 5 illustrates a second user interface window 500 which displays a profile page associated with User B 110. User A 104 may navigate to the second user interface window 500 during a video call with User B 110. For example, User A 104 may select the identity (e.g. real name or username) 406 of User B 110 displayed in the first user interface window 401 to navigate to the second user interface window 500. Alternatively, User A 104 may select the selectable button 408 displayed in the first user interface window 401 to navigate (directly or indirectly) to the second user interface window 500.

As shown in FIG. 5, the second user interface window 500 comprises a location 502 assigned for the display of User B's avatar (that would be displayed if the second user interface window 500 was accessed by User A 104 when not conducting a video call with User B 110).

In accordance with embodiments of the present disclosure, at step S310 the communication client application 112 displays the second user interface window 500 and displays the video data received over the network 106 from the user terminal 108 associated with User B 110 at the location 502.

The profile page displayed in the second user interface window 500 may comprise profile information 504 of User B 110 e.g. username, real name, current geographical location, time, gender, language, age and/or date of birth etc. The profile page displayed in the second user interface window 500 may additionally comprise a mood message 506 set by User B 110.

Embodiments of the present disclosure advantageously enable User A 104 to view the profile page information of User B 110 without this information being obstructed by the video data received over the network 106 from the user terminal 108 associated with User B 110 (as the received video data is displayed at location 502 in place of User B's avatar).

FIG. 6 illustrates a second user interface window 600 which displays a contact list associated with User A 104. User A 104 may navigate to the second user interface window 600 during a video call with User B 110. For example, User A 104 may select the selectable button 408 displayed in the first user interface window 401 to navigate (directly or indirectly) to the second user interface window 600.

As shown in FIG. 6, the second user interface window 600 comprises a location 602 assigned for the display of User B's avatar (that would be displayed if the second user interface window 500 was accessed by User A 104 when not conducting a video call with User B 110).

In accordance with embodiments of the present disclosure, at step S310 the communication client application 112 displays the second user interface window 600 and displays the video data received over the network 106 from the user terminal 108 associated with User B 110 at the location 602.

Embodiments of the present disclosure advantageously enable User A 104 to view his contact list (e.g. to view the presence status of one or more contacts) without this information being obstructed by the video data received over the network 106 from the user terminal 108 associated with User B 110 (as the received video data is displayed at location 602 in place of User B's avatar).

The location of the video data received over the network 106 from the user terminal 108 associated with User B 110 is fixed relative to the position of other user interface elements displayed in the second user interface window 600. Thus, if User A scrolls through the contact list, this scrolling action may cause the video data received over the network 106 from user terminal 108 associated with User B 110 to not be displayed on the display 204 if the scrolling action causes the location 602 to not be displayed in the second user interface window 600.

FIG. 7 illustrates a second user interface window 700 which displays information on User A's recent activity in the communication system 100. User A 104 may navigate to the second user interface window 700 during a video call with User B 110. For example, User A 104 may select the selectable button 408 displayed in the first user interface window 401 to navigate (directly or indirectly) to the second user interface window 700.

As shown in FIG. 7, the second user interface window 700 comprises a location 702 assigned for the display of User B's avatar (that would be displayed if the second user interface window 700 was accessed by User A 104 when not conducting a video call with User B 110), this may be due to for example User A 104 having a recent IM conversation with User B 110.

In accordance with embodiments of the present disclosure, at step S310 the communication client application 112 displays the second user interface window 700 and displays the video data received over the network 106 from the user terminal 108 associated with User B 110 at the location 702.

Embodiments of the present disclosure advantageously enable User A 104 to view his recent activity (e.g. to view the last message received in an IM conversation with User D "Launch date is 27 Jun. 2014") without this information being obstructed by the video data received over the network 106 from the user terminal 108 associated with User B 110 (as the received video data is displayed at location 702 in place of User B's avatar).

The location of the video data received over the network 106 from the user terminal 108 associated with User B 110 is fixed relative to the position of other user interface elements displayed in the second user interface window 700. Thus, if User A scrolls through the recent activity information, this scrolling action may cause the video data received over the network 106 from the user terminal 108 associated with User B 110 to not be displayed on the display 204 if the scrolling action causes the location 702 to not be displayed in the second user interface window 700.

Whilst embodiments of the present disclosure have been described above with reference to a video call between two users for simplicity, embodiments of the present disclosure also extend to a "multiparty" video call (reference to a "multiparty" video call is used herein to refer to a video call conducted between three or more users).

If User A 104 conducts a video call with two other Users e.g. User B 110 and a User C (not shown in FIG. 1) then the communication client application 112 displays the video data received from User B 110 and User C in the first user interface window 401. If during the video call, User A 104 navigates to a second user interface window which comprises a location for the display of both User B's avatar and User C's avatar (for example the second user interface window 600 shown in FIG. 6 and the second user interface window 700 shown in FIG. 7), then in accordance with embodiments of the present disclosure, the communication client application 112 displays the second user interface window and further controls the video data received over the communications network 106 from the user terminal 108 associated with User B 110 to be displayed at the location of the second user interface window that would otherwise be used to display User B's avatar (if the second user interface window was accessed by User A 104 when not conducting the video call), and further controls the video data received over the communications network 106 from the user terminal associated with User C to be displayed at the location of the second user interface window that would otherwise be used to display User C's avatar (if the second user interface window was accessed by User A 104 when not conducting the video call).

In contrast to prior art solutions which display a floating window showing video data received from only the active speaker during a multiparty video call, embodiments of the present disclosure enable User A 104 to view the information displayed in the second user interface window without this information being obstructed. Furthermore, the video data received from a plurality of participants in the video call will be displayed in the second user interface window if the second user interface window comprises assigned locations for the display of the plurality of participants' respective avatars. This enables User A 104 to retain a similar video call experience to that experience when the first user interface window 410 is being displayed whilst also being able to view information presented on the second user interface window.

If during the multiparty video call, User A 104 navigates to a second user interface window which comprises a location for the display of only one of the other video call participants' (e.g. User B 110) avatar, then in accordance with embodiments of the present disclosure, the communication client application 112 displays the second user interface window and further controls the video data received over the user terminal 108 associated with User B 110 to be displayed at the location of the second user interface window that would otherwise be used to display User B's avatar (if the second user interface window was accessed by User A 104 when not conducting the video call), in this scenario the video data received from the terminal associated with User C would not be displayed in the second user interface window.

Embodiments of the present disclosure advantageously allow a user (e.g. User A) to select the video that is rendered during a multiparty video call by navigating to a second user interface window comprising information pertaining to a particular participant of the video call to view the video data received from the particular participant. For example during the video call with User B 110 and User C, User A can navigate to a second user interface 500 which displays a profile page associated with User B 110 which comprises a location 502 assigned for the display of User B's avatar. In accordance with embodiments of the present disclosure, the communication client application 112 displays the second user interface window 500 and displays the video data received over the network 106 from the user terminal 108 associated with User B 110 at the location 502. The video data received from the terminal associated with User C would not be displayed in the second user interface window 500 as the second user interface 500 does not comprise a location assigned for the display of User C's avatar.

User A may then navigate, during the video call, to a second user interface which displays a profile page associated with User C which comprises a location assigned for the display of User C's avatar. In accordance with embodiments of the present disclosure, the communication client application 112 displays the second user interface window and displays the video data received over the network 106 from the user terminal associated with User C at the location assigned for the display of User C's avatar. The video data received from the terminal associated with User B 110 would not be displayed in the second user interface window as the second user interface does not comprise a location assigned for the display of User B's avatar.

This is in contrast to known solutions which display a floating window which only displays video data received from the active speaker when a user navigates away from a main video presentation screen.

Whilst embodiments of the present disclosure have been described with reference to certain exemplary second user interface windows (comprising profile page, contact list, recent activity) these are merely examples of information which may be displayed in second user interface windows that User A 104 may navigate to during a video call with User B 110. Embodiments of the present disclosure are not limited to these examples and are applicable to any second user interface window which is configured to display an avatar of at least one remote participant of the video call.

The client user interface provided by the communication client application 112 displays content in an available area 400 of the display 204. As depicted in FIGS. 4-7, the available area of the display is the whole of the display 204. However, it is envisaged that the available area of the display (that is the area available to the client 112) may constitute only a portion of the display e.g. with the remainder of the display being used by the operating system 214 and/or other application(s) executed thereon to display other content.

Figure 3:
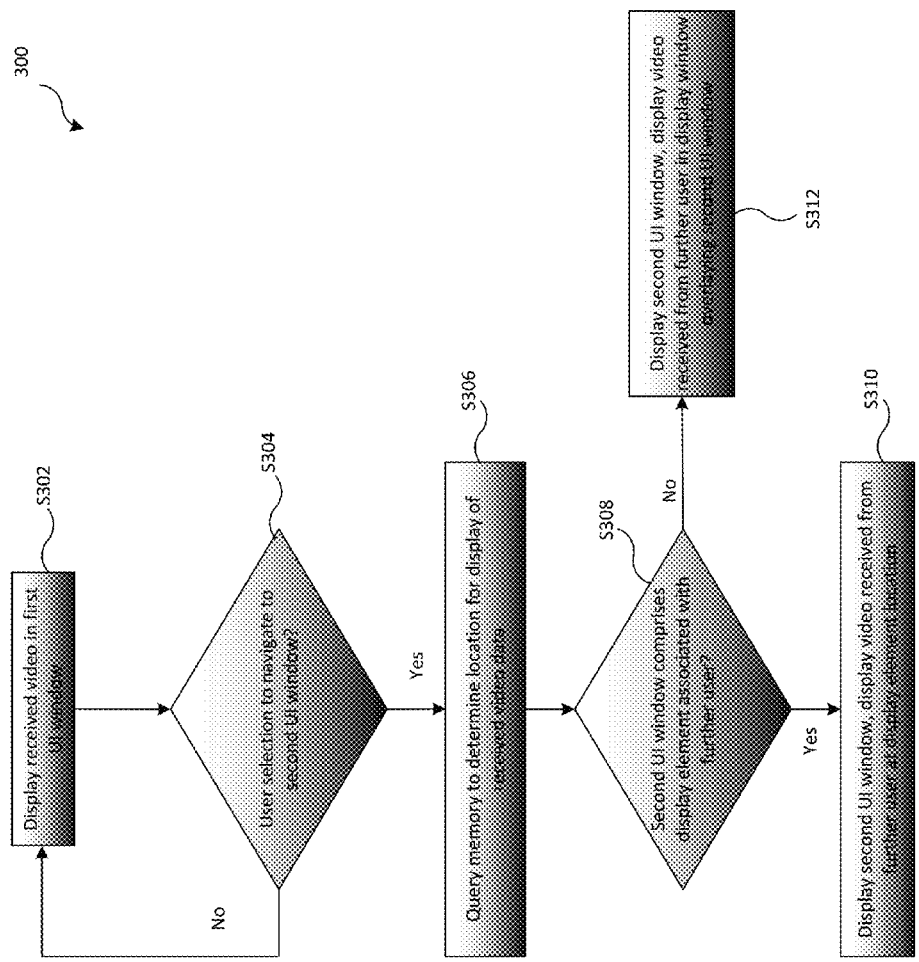
FIG. 3 is a flow chart for a process of displaying received video call data.

The steps shown separately in FIG. 3 may or may not be implemented as separate steps.

Generally, any of the functions described herein can be implemented using software, firmware, hardware (e.g., fixed logic circuitry), or a combination of these implementations. The terms "controller", "functionality", "component", and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user device comprising:
   a display;
   a network interface configured to transmit and receive video data between the user device and a communication network during a video call between a user of said user device and at least one further user;
   a memory storing information identifying at least one display element each associated with one of said at least one further user; and
   one or more processors configured to run a communication client application operable during said video call to:
      display received video of the video call in a first user interface window on said display;
      detect an input selection by the user of said user device to navigate to a second user interface window comprising one of said at least one display element;
      query said memory to determine a location for the display of the received video of the video call, and in response to said query display the second user interface window on the display and control the video of the video call received from the further user associated with said display element of the second user interface window to be displayed at a location of said display element associated with said further user of the video call.

2. A user device according to claim 1, wherein the video call is conducted between the user of said user device and a plurality of further users; the communication client application operable during said video call to:
   detect an input selection by the user of said user device to navigate to a second user interface window comprising a plurality of display elements each associated with one of said plurality of further users;
   query said memory to determine a location for the display of the received video of the video call, and in response to said query display the second user interface window on the display and for each of the plurality of further users control the video of the video call received from the further user to be displayed at a location of the display element associated with the further user.

3. A user device according to claim 1, wherein the second user interface window comprises profile information of the further user associated with said display element.

4. A user device according to claim 1, wherein the second user interface window comprises a contact list associated with the user of said user device.

5. A user device according to claim 1, wherein the second user interface window comprises communication event activity information associated with the user of said user device.

6. A user device according to claim 1, wherein the second user interface window comprises a plurality of user interface elements, and said location is fixed relative to the position of the plurality of user interface elements displayed in the second user interface window.

7. A user device according to claim 1, wherein the first user interface window comprises a selectable element, and the communication client application operable to detect the input selection by the user of said user device to navigate to the second user interface window by detecting selection of said selectable element.

8. A user device according to claim 7, wherein the selectable element is a selectable button.

9. A user device according to claim 7, wherein the selectable element is a displayed identity of the further user associated with said display element.

10. A user device according to claim 1, wherein the first user interface window comprises selectable buttons for control of said video call.

11. A user device according to claim 1, wherein the information identifying at least one display element each associated with one of said at least one further user is configured by a provider of the a communication client application.

12. A user device according to claim 1, wherein the display element associated with a further user comprises a graphical image.

13. A user device according to claim 12, wherein the graphical image is selected by the further user to represent themselves to other users.

14. A user device according to claim 1, wherein the user device further comprises an input device for receiving said input selection.

15. A user device according to claim 14, wherein the input device comprise one or more of a keypad, touch screen, microphone, and a computer mouse.

16. A user device according to claim 1, wherein the user device is one of: a mobile telephone; a handheld game console; a personal digital assistant;
    a personal computer; a tablet computer; and a laptop computer.

17. A user device according to claim 1, wherein the communication network is a packet based communication network.

18. A computer readable memory device comprising instructions stored thereon that, responsive to execution by a processor of a user device, is configured to:
    display received video of a video call between a user of the user device and an additional user in a first user interface window on a display of said user device;

detect an input selection by the user of said user device to navigate to a second user interface window comprising a display element associated with the additional user; and
   query a memory storing information identifying the display element associated with the additional user, and in response to said query display the second user interface window on the display and control the video of the video call received from the additional user to be displayed at a location of said display element associated with the additional user.

19. The computer readable memory device according to claim 18, wherein the video call is conducted between the user of said user device and a plurality of additional users, and wherein the instructions, responsive to execution by the processor of the user device, is further configured to:
   detect an input selection by the user of said user device to navigate to a second user interface window comprising a plurality of display elements each associated with one of said plurality of additional users;
   query said memory to determine a location for the display of the received video of the video call, and in response to said query display the second user interface window on the display and for each of the plurality of additional users control the video of the video call received from the additional user to be displayed at a location of the display element associated with the additional user.

20. A method implemented at a user device, the method comprising:
   receiving video of a video call between a user of the user device and an additional user;
   displaying the received video of the video call in a first user interface window on a display of said user device;
   detecting an input selection to navigate to a second user interface window that includes a graphical image associated with the additional user; and
   displaying the second user interface window on the display and controlling the video of the video call to be displayed at a location of said graphical image such that the video of the video call replaces the display of the graphical image.

* * * * *